US010720839B1

(12) United States Patent
Yamada et al.

(10) Patent No.: US 10,720,839 B1
(45) Date of Patent: Jul. 21, 2020

(54) SYSTEM AND METHOD FOR OPERATING A SWITCHING CONVERTER IN LIGHT LOAD

(71) Applicant: Dialog Semiconductor (UK) Limited, London (GB)

(72) Inventors: Kohei Yamada, Yokohama (JP); Hirohisa Tanabe, Yokohama (JP); Naoyuki Unno, Kawasaki (JP)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/574,243

(22) Filed: Sep. 18, 2019

(51) Int. Cl.
*H02M 3/158* (2006.01)
*H02M 1/00* (2006.01)

(52) U.S. Cl.
CPC ......... *H02M 3/158* (2013.01); *H02M 1/0061* (2013.01); *H02M 2001/0003* (2013.01)

(58) Field of Classification Search
CPC ...... H02M 3/156; H02M 3/157; H02M 3/158; H02M 3/1582; H02M 3/1588; H02M 1/0061; H02M 2001/0003; H02M 2001/0012; H02M 2001/0016
See application file for complete search history.

(56) References Cited

U.S. PATENT DOCUMENTS

| 9,685,868 | B2* | 6/2017 | de Cremoux | H02M 1/083 |
|---|---|---|---|---|
| 2006/0164057 | A1* | 7/2006 | Kudo | H02M 3/1588 323/282 |
| 2016/0322900 | A1* | 11/2016 | Xu | H02M 3/1588 |
| 2018/0131275 | A1* | 5/2018 | Guan | H02M 3/156 |
| 2019/0393796 | A1* | 12/2019 | Fukushima | H02H 7/1213 |

OTHER PUBLICATIONS

"High Efficiency Integrated Power Solution for Multicell Lithium Ion Applications," ADP5080, © 2013-2014 Analog Devices, Inc. Application Data Sheet, pp. 1 and 27.

* cited by examiner

*Primary Examiner* — Adolf D Berhane
(74) *Attorney, Agent, or Firm* — Saile Ackerman LLC; Stephen B. Ackerman

(57) ABSTRACT

A switching converter and a method for providing an output voltage is presented. The switching converter includes an inductor coupled to a pair of power switches, a signal generator and a controller. The first power switch is used to magnetize the inductor, while the second power switch is used to de-magnetize it. The signal generator is adapted to generate a modulated signal having a pulse width variable between a minimum value and a maximum value and to drive the first and second power switches based on the modulated signal. Upon identifying that the modulated signal has the minimum pulse width value, the controller increases a reverse current flowing from the inductor through the second power switch to prevent the output voltage from increasing above a target value.

22 Claims, 13 Drawing Sheets

SYSTEM AND METHOD FOR OPERATING A SWITCHING CONVERTER IN LIGHT LOAD

TECHNICAL FIELD

The present disclosure relates to a system and method for operating a switching converter. In particular, the present disclosure related to a method of controlling the operation of a synchronous rectifier switch of a switching converter in light load conditions.

BACKGROUND

Switching converters such as buck, boost or buck-boost converters operate based on the cyclic magnetization and de-magnetization of an inductor associated with the respective increase and decrease of inductor current. The control of the magnetization and de-magnetization phases relies on a pair of power switches often referred to as main switch and synchronous rectifier switch. In operation the main switch is used for increasing the current of the inductor and the synchronous rectifier switch is used for decreasing it. Such switching converters rely on a careful timing operation of the main switch and the synchronous rectifier switch; when one of them is open the other is closed and vice versa.

Such DC-DC converters may be operated under various load conditions. When operating in light load conditions, conventional converters are configured to turn off the synchronous rectifier switch at a time when the inductor current decreases to a predetermined value. If the predetermined value is set to zero, the converter can only deliver a positive current to the load and the output voltage increases at every cycle. A so-called pulse skip method may be implemented to prevent the output voltage from increasing above a certain level. However, pulse skipping techniques are not suitable for applications requiring fixed switching frequencies. Alternatively, the predetermined value may be set to a negative value to guarantee regulation of the output voltage even when there is no load current. However this approach lowers the efficiency of the system.

SUMMARY

It is an object of the disclosure to address one or more of the above-mentioned limitations. According to a first aspect of the disclosure, there is provided a switching converter for providing an output voltage, the switching converter comprising an inductor coupled to a first power switch and a second power switch at a switching node, the first power switch being adapted to magnetize the inductor and the second power switch being adapted to de-magnetize the inductor; a signal generator adapted to generate a modulated signal having a pulse width variable between a minimum value and a maximum value; and a controller adapted to drive the first and second power switches based on the modulated signal; and to increase a reverse current flowing from the inductor through the second power switch to prevent the output voltage from increasing above a target value, upon identifying that the modulated signal has the minimum pulse width value.—For instance the signal generator may comprise a voltage-to-pulse converter.

Optionally, the switching converter comprises a feedback circuit adapted to generate a regulation signal to adjust the pulse width based on the output voltage, wherein the controller is adapted to increase the reverse current upon identifying that the regulation signal is configured to reduce the pulse width. For example the regulation signal may be an amplified error voltage.

Optionally, the controller is adapted to provide a control signal to control an amount of the reverse current, and an adjustment signal to adjust the control signal.

Optionally, the controller is adapted to generate the adjustment signal based on one or more signals generated by the signal generator.

Optionally, the controller comprises a reference generator adapted to generate a reference voltage associated with an amount of reverse current. For instance the reference voltage may correspond to an amount of reverse current above which the second power switch should be turned off (open).

Optionally, the reference generator is adapted to generate the adjustment signal and to adjust the reference voltage using the adjustment signal.

Optionally, the controller comprises a comparator adapted to compare a voltage at the switching node with the reference voltage to generate the control signal.

Optionally, the adjustment signal is an adjuster current, the reference generator comprising an adjuster circuit for generating the adjuster current.

Optionally, the signal generator comprises a ramp generator configured to provide a ramp voltage based on a base voltage; and a comparator adapted to compare the ramp voltage with the regulation signal to provide a first logic signal. For example, the first logic signal may be configured to turn the modulated signal from a high state, for instance a logic 1, to a low state, for instance a logic 0.

Optionally, the adjuster circuit is adapted to generate the adjuster current based on a difference between the base voltage and the regulation signal.

Optionally, the signal generator comprises a pulse-width generator adapted to provide a second logic signal, the adjuster circuit being adapted to generate the adjuster current based on the first logic signal and the second logic signal. For example, the second logic signal may be configured to turn the modulated signal from a low state, for instance a logic 0, to a high state, for instance a logic 1.

Optionally, the adjuster circuit comprises a counter coupled to a current source.

Optionally, the signal generator comprises a memory device adapted to generate the modulated signal based on the first logic signal and the second logic signal, the adjuster circuit being adapted to generate the adjuster current based on the first logic signal, the second logic signal and the modulated signal. For example the memory device may be a latch or a flip-flop.

Optionally, the adjuster circuit comprises a charge pump coupled to a voltage-to-current converter.

Optionally, the controller comprises a delay circuit coupled to the signal generator; the delay circuit being adapted to delay the control signal based on the adjustment signal.

Optionally, the adjustment signal is an adjuster current, the delay circuit comprising an adjuster circuit for generating the adjuster current.

Optionally, the switching converter is adapted to operate with a constant switching frequency.

According to a second aspect of the disclosure, there is provided a method of controlling a switching converter comprising an inductor coupled to a first power switch and a second power switch at a switching node, the first power switch being adapted to magnetize the inductor and the second power switch being adapted to de-magnetize the inductor; the method comprising generating a modulated signal having a pulse width variable between a minimum value and a maximum value; driving the first and second power switches based on the modulated signal for regulating an output voltage of the switching converter; and upon identifying that the modulated signal has the minimum pulse width value, increasing a reverse current flowing from the inductor through the second power switch to prevent the output voltage from increasing above a target value.

Optionally, the method comprises providing a control signal to control an amount of the reverse current and generating an adjustment signal to adjust the control signal.

Optionally, the method comprises providing a reference voltage associated with an amount of reverse current and adjusting the reference voltage using the adjustment signal.

Optionally, the method comprises delaying the control signal using the adjustment signal.

Optionally, the inductor provides an inductor current oscillating between valley and peak values that vary for different load conditions; wherein the reverse current corresponds to a valley inductor current.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which.

DESCRIPTION

Figure 1A:
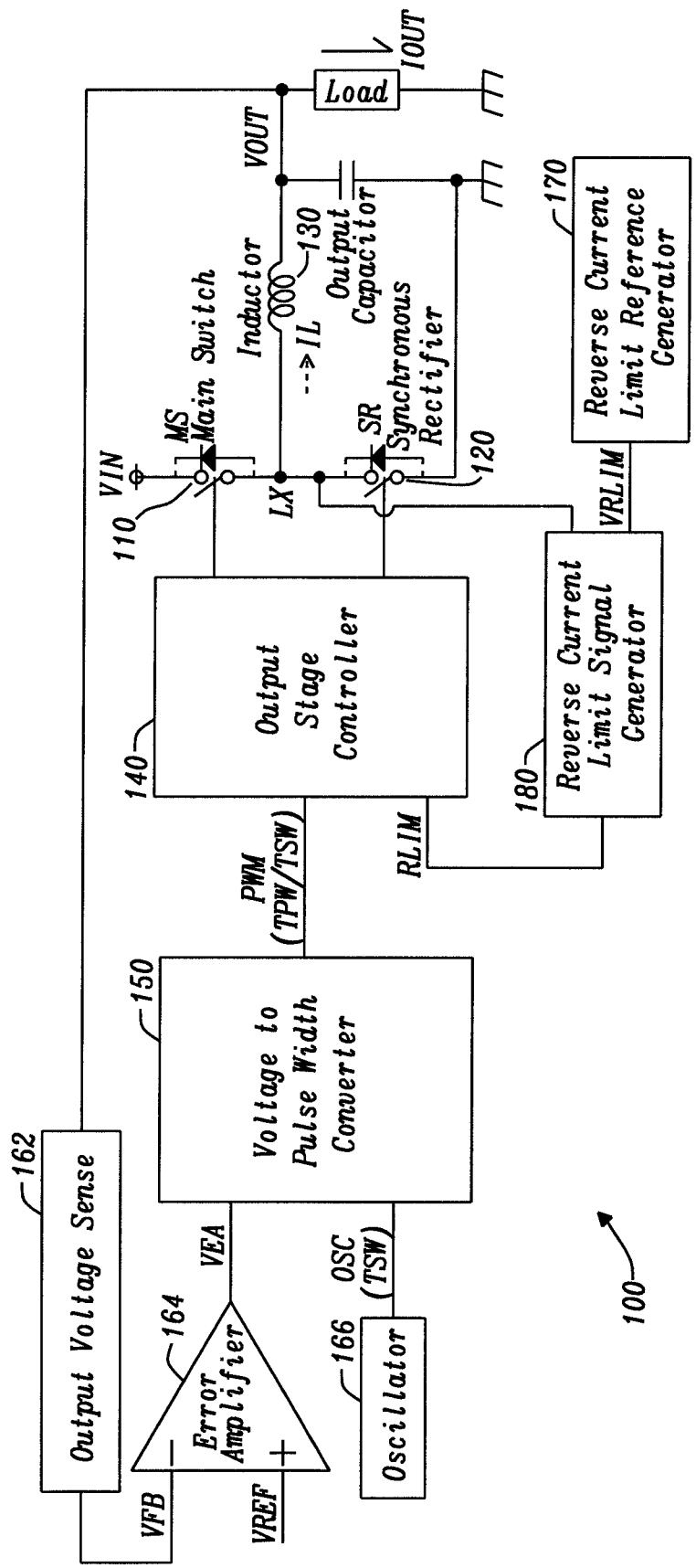
FIG. 1A is a diagram of a conventional Buck switching converter.

FIG. 1A illustrates a conventional switching converter such as a DC-DC buck converter. The converter 100 includes a main switch MS 110, coupled to a synchronous rectifier switch SR 120. The main switch 110 and the synchronous rectifier switch 120 are coupled at a switching node LX.

An inductor 130 couples the switching node LX to the output node. An output stage controller 140, including drivers, is provided to drive the main switch 110 and the synchronous rectifier switch 120, respectively. The output of the converter is coupled to the input of the output stage controller 140 via a feedback loop provided by an output voltage sensor 162, an error amplifier 164 and a voltage to pulse width converter 150. The voltage sensor 162 may be provided by a resistor-based voltage divider. The error amplifier 164 has a first input such as an inverting input for receiving a feedback voltage VFB from the output voltage sensor 162 and a second input such as a non-inverting input for receiving a reference voltage VREF. The error amplifier 164 is provided with appropriate gain phase characteristics to control the DC-DC converter in a stable fashion.

The voltage to pulse width converter 150 has a first input for receiving an amplified error voltage VEA from the error amplifier 164, and a second input for receiving an oscillating signal having a period TSW from the oscillator 166.

The output stage controller 140 has a first input for receiving a pulse width modulation PWM signal from the voltage to pulse width converter 150, a second input for receiving a reverse limit signal RLIM from a reverse current limit signal generator 180, and two outputs for driving the main switch 110 and the synchronous rectifier switch 120, respectively. The output stage controller 140 includes a first driver for driving the main switch 110 and a second driver for driving the synchronous rectifier switch. The output stage 140 may also include a logic circuitry for receiving the PWM and RLIM signals and a timing circuitry to prevent cross-conduction of the main switch and the synchronous rectifier switch.

The switching converter 100 is also provided with a reverse current limit reference generator 170 for providing a limit reference voltage VRLIM to the reverse current limit signal generator 180. The reverse current limit signal generator 180 has a first input coupled to the switching node LX, a second input coupled to the output of the reference current limit generator 170, and an output for providing the reverse limit signal RLIM to the output stage controller 140.

In operation, the voltage output VOUT provided by the switching converter 100 is sensed by the voltage sensor 162 and provided as a feedback voltage VFB to the error amplifier 164. The error amplifier 164 compares the feedback voltage VFB with a reference voltage VREF and generates an output voltage VEA which is then provided to the voltage to pulse width converter 150.

The voltage to pulse converter 150 receives an oscillating signal of period TSW from the oscillator 166 and generates a pulse width modulation PWM signal having a frequency 1/TSW. The PWM signal is then provided to the output stage controller 140 which drives the main switch 110 and the synchronous rectifier switch 120, respectively. The main switch 110 is turned on depending on the PWM signal. When the main switch 110 is turned on, the synchronous rectifier switch is turned off, and when the main switch is turned off, the synchronous rectifier switch is turned on fully or partially.

When the main switch 110 is turned on, a current IL flowing through the inductor and towards the output, increases. When the main switch 110 is turned off and the synchronous rectifier switch 120 is turned on, the current IL decreases. In order to maximise the efficiency of the DC-DC converter in light-load conditions, the synchronous rectifier switch 120 should be turned off just before the inductor current IL becomes negative. In the description the current flowing from the output node towards the switching node LX is referred to as the reverse current. The reverse current limit signal generator 180 compares the voltage VLX at the switching node with the limit reference voltage VRLIM provided by the reverse current limit reference generator 170, to generate the reverse limit signal RLIM. When the output stage controller 140 receives the reverse current limit signal RLIM, it stops the reverse current by turning off (open) the synchronous rectifier 120.

Figure 1B:
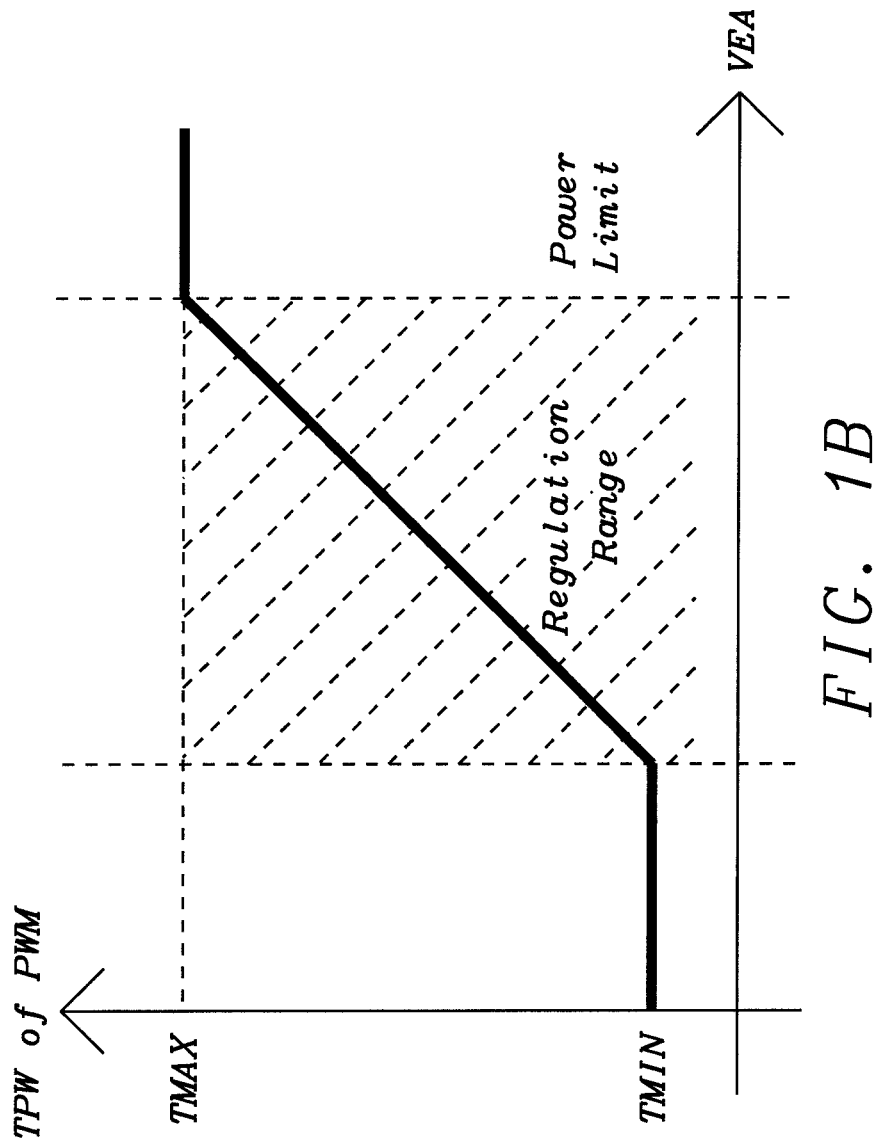
FIG. 1B is a plot of the pulse width of a PWM signal generated as a function of the amplified error voltage.

FIG. 1B illustrates the variations of the pulse width TPW of the PWM signal generated by the voltage to pulse width converter 150, as a function of the amplified error voltage VEA provided by the of the error amplifier 164. A minimum pulse width TMIN and a maximum pulse width TMAX are employed to control the PWM signal. The maximum pulse width TMAX is less than 100% of duty cycle. The slope of the pulse width TPW as a function of the VEA may be changed depending on various parameters such as the current flowing through the main switch 110. This is what is commonly known as current mode control.

When the output stage controller 140 stops the reverse current by turning off the synchronous rectifier 120, the DC-DC converter 100 can only deliver a positive current to the load. Consequently, in very light load conditions, the current delivered by a minimum pulse width exceeds the load and the output voltage increases at every cycle. For this reason, a so-called pulse skip operation is required in order to prevent the output voltage from increasing beyond a desired value.

In pulse skip operation, the turn on duration of the main switch 110 is skipped when the amplified error voltage VEA provided by the error amplifier 164 is lower than a predetermined voltage. This approach works well for regulation of the output voltage however it is not suitable for applications requiring fixed switching frequencies. Alternatively, the reverse current limit VRLIM may be chosen to allow enough reverse current to guarantee regulation, even when there is no load current. However, using this approach lowers the efficiency of the system since more reverse current is used than is necessary in most conditions.

Figure 2:
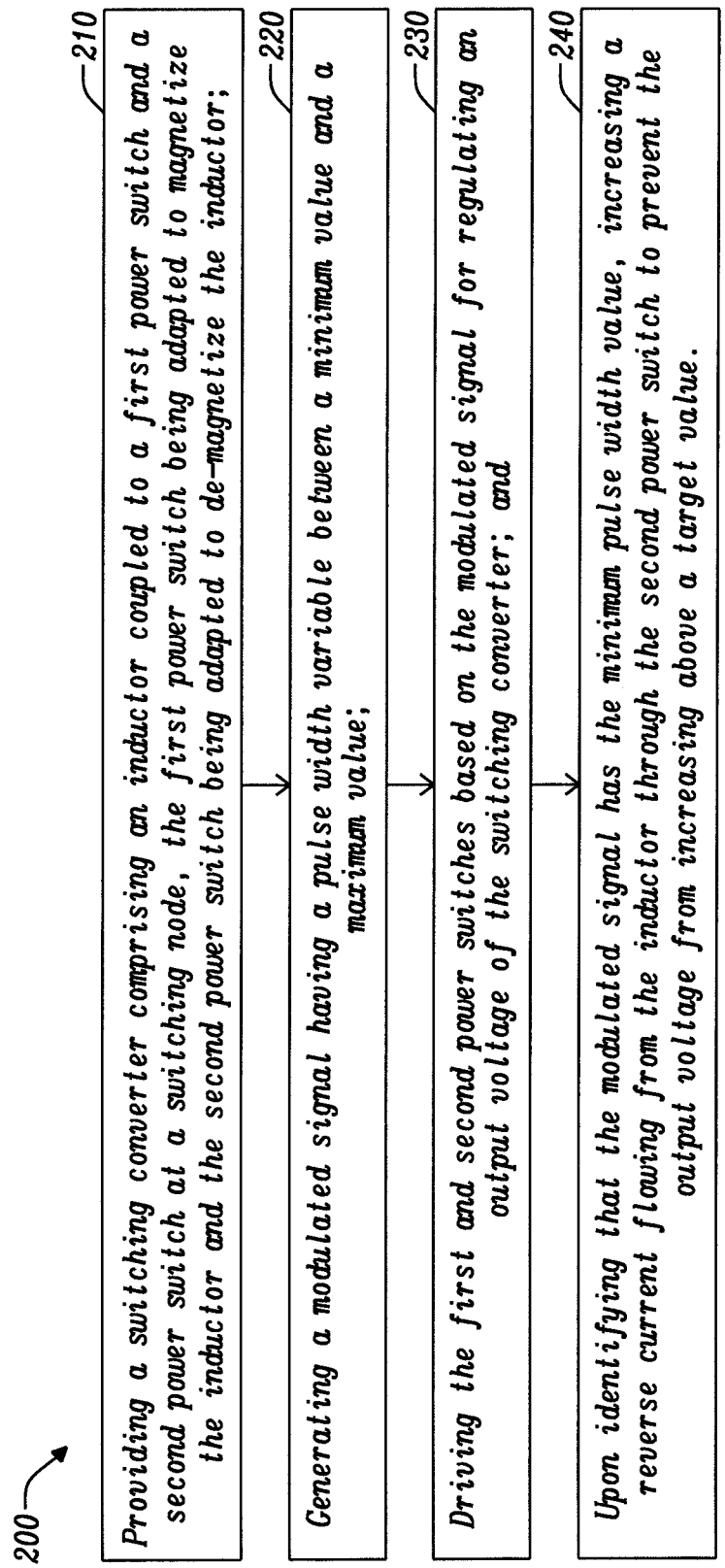
FIG. 2 is a flow chart of the method for operating a switching converter according to the disclosure.

FIG. 2 is a flow chart of a method for operating a switching converter according to the disclosure. At step 210 a switching converter is provided. The switching converter includes an inductor coupled to a first power switch and a second power switch at a switching node. The first power switch is adapted to magnetize the inductor and the second power switch is adapted to de-magnetize the inductor. For instance the second power switch may be a synchronous rectifier transistor. At step 220 a modulated signal is generated.

The modulated signal has a pulse width variable between a minimum value and a maximum value. At step 230 the first and second power switches are driven based on the modulated signal for regulating the output voltage. At step 240 a reverse current flowing from the inductor through the second power switch is increased to prevent the output voltage from increasing above a target value. This is achieved upon identifying that the modulated signal has the minimum pulse width value.

The inductor of the switching converter provides an inductor current oscillating between valley and peak values. These valley and peak values vary for different load conditions. The reverse current corresponds to a valley inductor current. As the load decreases the negative value of the valley inductor current increases, hence becomes increasingly negative.

Using this approach, allows improving the efficiency of the power converter. This can be achieved even when the power converter is operated with a constant switching frequency.

Figure 3:
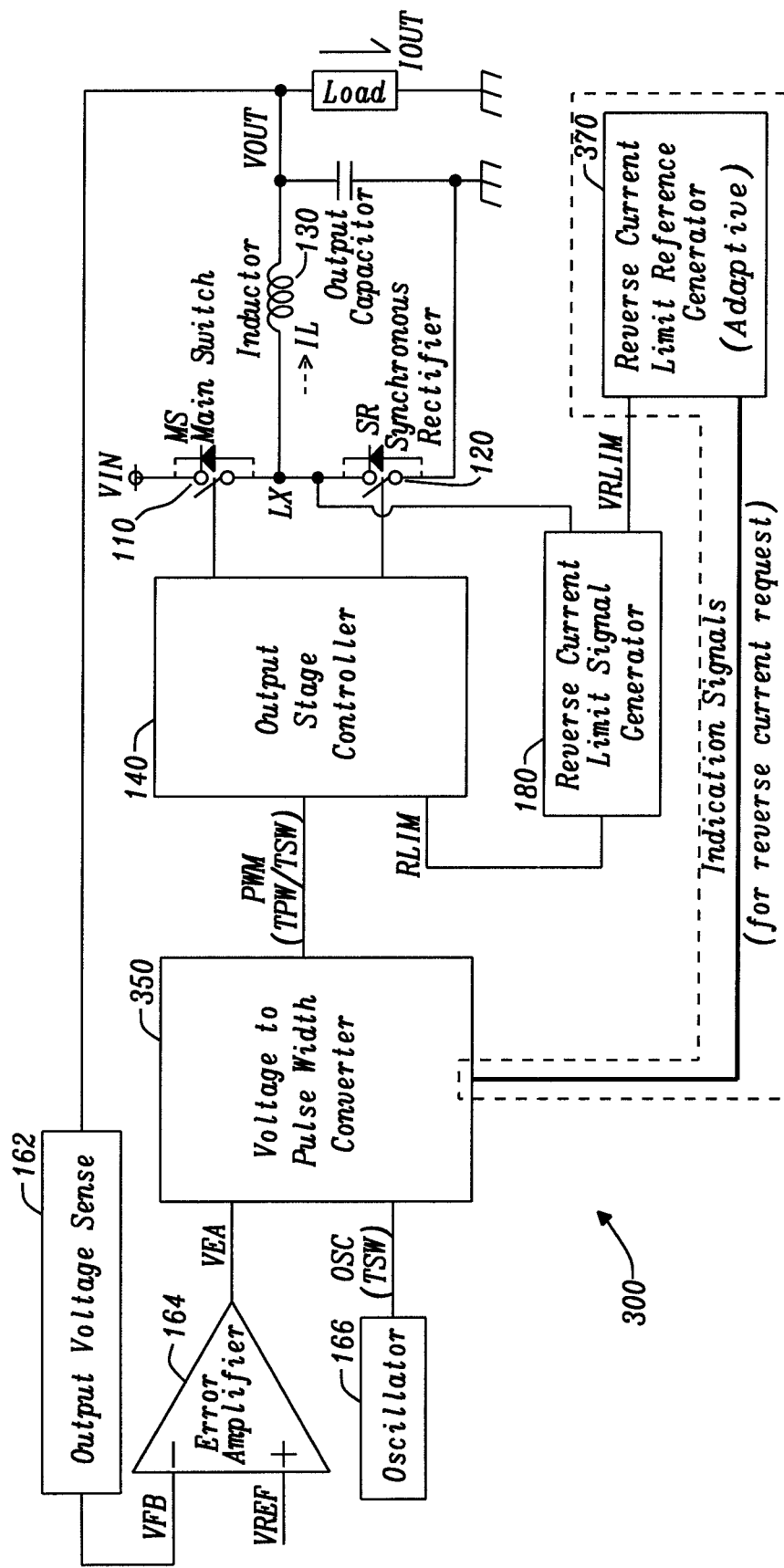
FIG. 3 is diagram of a circuit for implementing the method of FIG. 2.

FIG. 3 is a diagram of a circuit for implementing the method of FIG. 2. The DC-DC converter 300 of FIG. 3 shares several components with the converter 100 of FIG. 1. Similar components have been labelled with the same reference number and these components will not be described for the sake of brevity.

In FIG. 3, the voltage to pulse width converter 150 has been replaced with a voltage to pulse width converter 350 adapted to provide one or more indication signals, indicative of whether the reverse current should be increased, decreased or maintained at a certain level to maintain regulation of the output voltage of the DC-DC converter with a minimum requirement amount of the reverse current. The reverse current limit reference generator 170 of FIG. 1 has been replaced with an adaptive reverse current limit reference generator 370. The adaptive reverse current limit generator 370 has an input for receiving one or more indication signals from the voltage to pulse width converter 350 and an output for providing an adjusted voltage reference limit VRLIM. The nature of the indication signals may vary depending on the implementation of the adaptive reverse current limit reference generator 370. For instance, the indication signals may include various signals either received by the voltage pulse width converter 350 or provided by the voltage pulse width converter 350. For example, the indication signals may include the amplified error voltage VEA provided by the error amplifier, the PWM signal provided by the voltage to pulse width converter or a ramp signal used within the voltage to pulse width converter 350.

In the circuit 300, the inductor current is sensed by sensing the voltage across the synchronous rectifier 120 using the reverse current limit signal generator 180. However it will be appreciated that the inductor current may be sensed using other techniques. For instance, a resistance may be inserted in series with the inductor and a voltage drop may be measured across the resistance. Alternatively a current sense transformer could be used.

In operation, when the DC-DC converter 300 is operating in light load conditions, the reverse current is adjusted to the amount required for regulating the output voltage. If the DC-DC converter operates with a constant switching frequency, then the reverse current is adjusted to the amount required for regulating the output voltage at the constant switching frequency. This is achieved by controlling when the synchronous rectifier 120 should be turned off. When the DC-DC converter is operating in normal or in high load conditions, the reverse current is adjusted to be zero as in a typical Discontinuous Conduction Mode (DCM) of operation.

Figure 4:
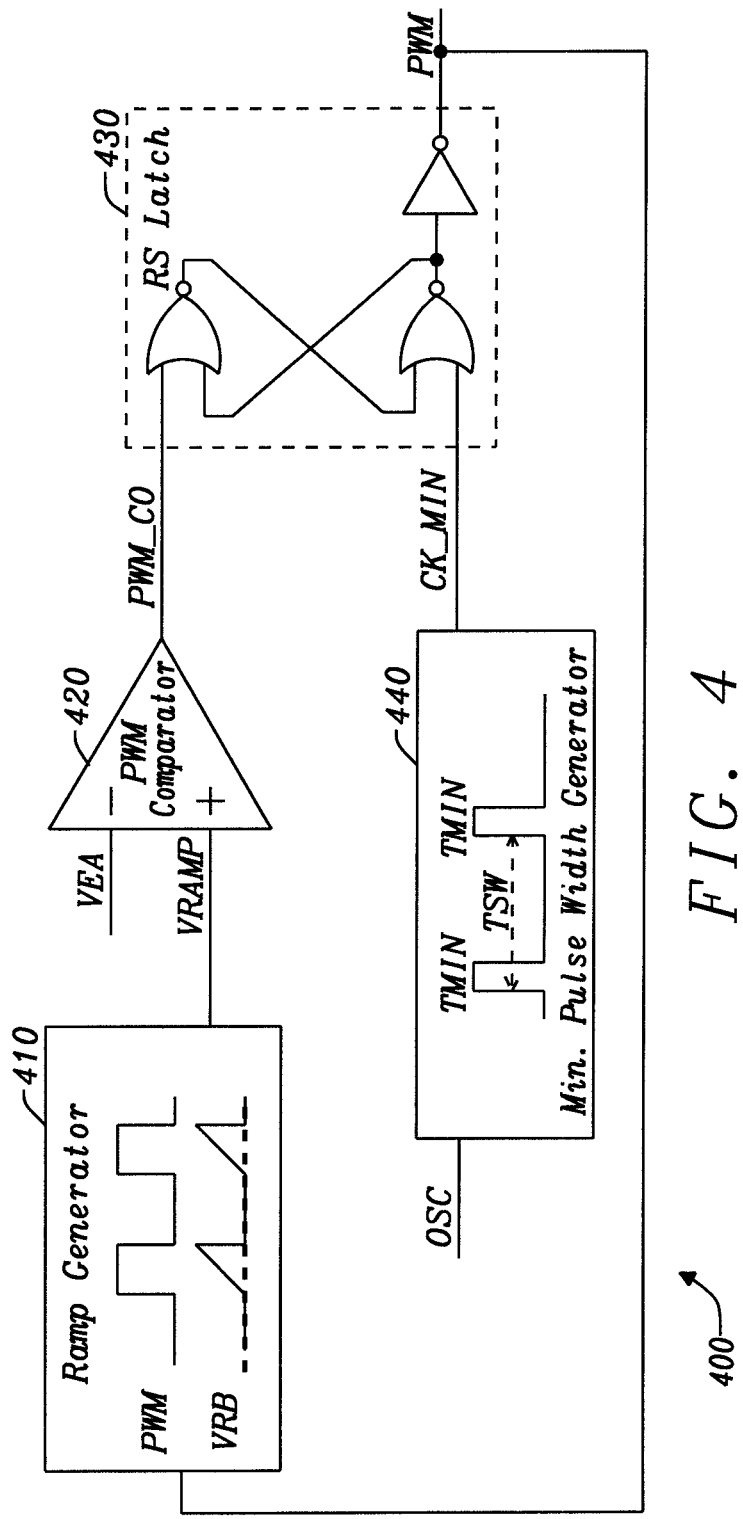
FIG. 4 is a diagram of a voltage pulse width converter.

FIG. 4 is a diagram of an exemplary voltage to pulse width converter for use with the converter of FIG. 3. The voltage to pulse width converter 400 includes a ramp generator 410, a PWM comparator 420, a memory device 430 and a pulse width generator 440. The ramp generator 410 has an input coupled to the output of the voltage to pulse width converter 400, and an output for providing a ramp signal VRAMP. The PWM comparator 420 has a first input, such as a non-inverting input for receiving VRAMP, a second input such as an inverting input for receiving the amplified error voltage VEA, and an output for providing a comparison signal PWM_CO based on the comparison of VRAMP with VEA, also referred to as the off-trigger signal.

The minimum pulse width generator 440 has an input for receiving an oscillator signal and an output for providing a so-called on-trigger signal CK_MIN.

The memory device 430 has a first input for receiving the PWM_CO signal from the PWM comparator 420, a second input for receiving the CK_MIN signal from the minimum pulse width generator 440 and an output for providing the PWM signal. For instance, the memory device 430 may be implemented as a flip-flop such as a Reset Set Latch device. In this case the PWM_CO signal is provided at the reset input, and the CK_MIN is provided at the set input of the RS Latch. The on-trigger signal CK_MIN is synchronous to the oscillator signal and has a pulse width corresponding to the minimum pulse width TMIN. The CK_MIN signal is provided to the RS latch 430 to set the latch and keep the PWM signal high. The ramp generator 410 provides the ramp signal VRAMP which increases from a base voltage VRB as a function of time while the PWM signal is high. The PWM comparator 420 compares the VRAMP signal with the amplified error voltage VEA to generate the off-trigger signal PWM_CO. When the VRAMP signal is greater than VEA, the off-trigger signal PWM_CO is provided to the RS latch to turn the PWM signal low. Depending on the specific implementation of the adaptive reverse current limit reference generator 370, the indication signal may include one or more of the amplified error voltage VEA, the base voltage signal VRB, the ramp signal VRAMP, the off-trigger signal PWM_CO, the on-trigger signal CK_MIN and the PWM signal.

Figure 5A:
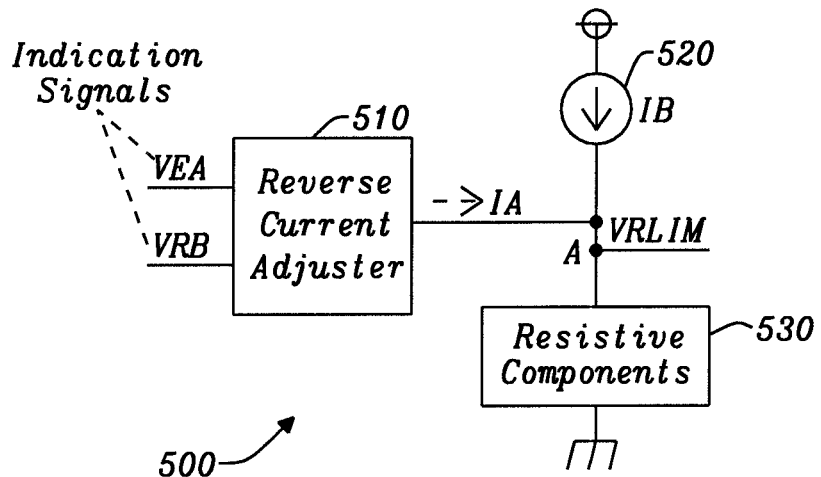
FIG. 5A is a diagram of an adaptive reverse current limit reference generator for use with the circuit of FIG. 3.

FIG. 5A is a diagram of an adaptive reverse current limit reference generator. The generator 500 includes a reverse current adjuster 510 adapted to generate a current based on the indication signals VEA and VRB. The reverse current adjuster 510 has a first input for receiving VEA, a second input for receiving VRB, and an output for providing an adjuster current IA. The output of the reverse current adjuster 510 is coupled to the output of a current source 520 and to a resistive component at node A. The resistive component 530 may be chosen to have similar process, voltage and temperature variation as the on-resistance of the synchronous rectifier switch 120. For instance, the resistive component 530 may be a resistor or a transistor having an on-resistance that matches the on-resistance of the synchronous rectifier 120. In operation, the reverse current adjuster 510 provides an adjuster current IA to increase the reverse current as much as necessary for regulating the output voltage of the DC-DC converter. The reverse current adjuster 510 compares the amplified error voltage VEA with the base voltage of the ramp voltage VRB to generate the adjuster current IA. The adjuster current IA is then used to adjust the voltage VRLIM provided at node A. As the adjuster current IA increases, the voltage VRLIM also increases. Similarly, as the adjuster current IA decreases, the voltage VRLIM also decreases.

Figure 5B:
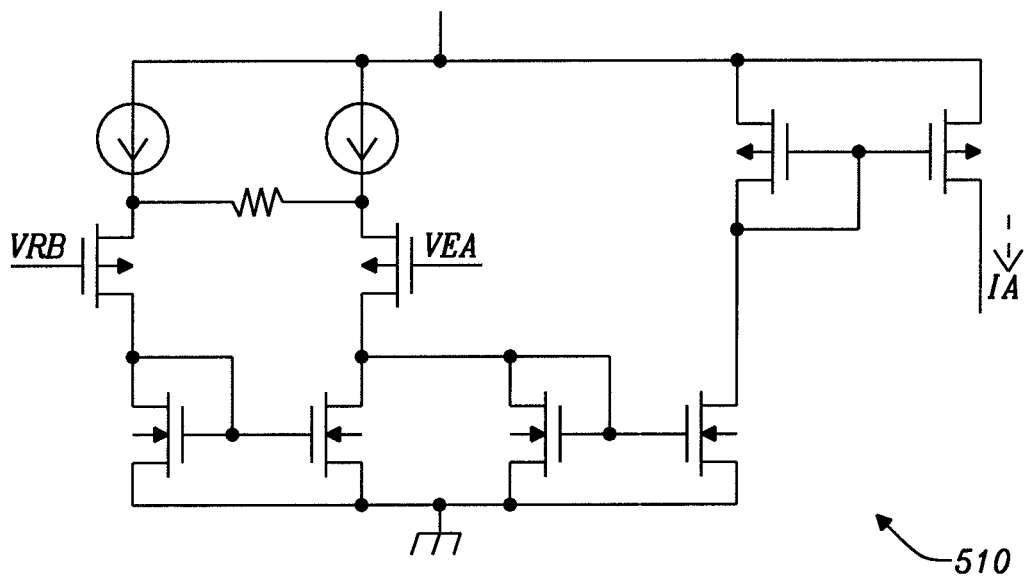
FIG. 5B is a reverse current adjuster for use in the diagram of FIG. 5A.

FIG. 5B illustrates an exemplary implementation of the reverse current adjuster 510. In this example, the reverse current adjuster 510 includes a differential input stage coupled to three current mirrors. It will be appreciated that other types of circuit topology may be used. The adjuster current IA is proportional to the difference VRB-VEA when VEA is lower than VRB and keeps zero when VEA is equal to or higher than VRB.

Figure 6A:
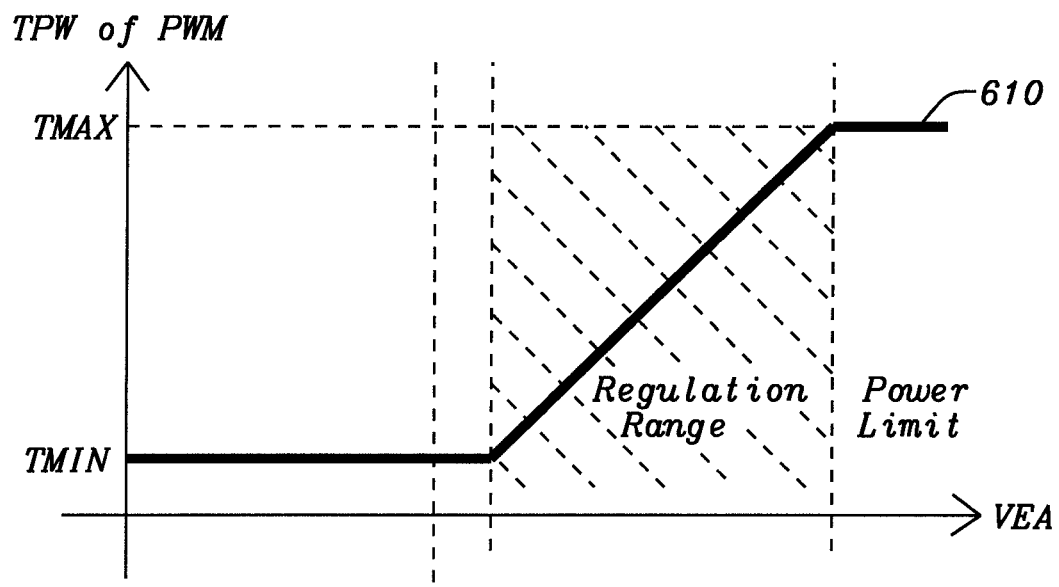
FIGS. 6A and 6B are line plots illustrating the working of the reverse current adjuster of FIG. 5B.

FIG. 6A illustrates the variations of the pulse width TPW 610 of the PWM signal generated by the voltage to pulse width converter 350, as a function of the amplified error voltage VEA. The pulse width 610 is equal to the minimum value TMIN for VEA lower than a voltage which is slightly higher than VRB.

Figure 6B:
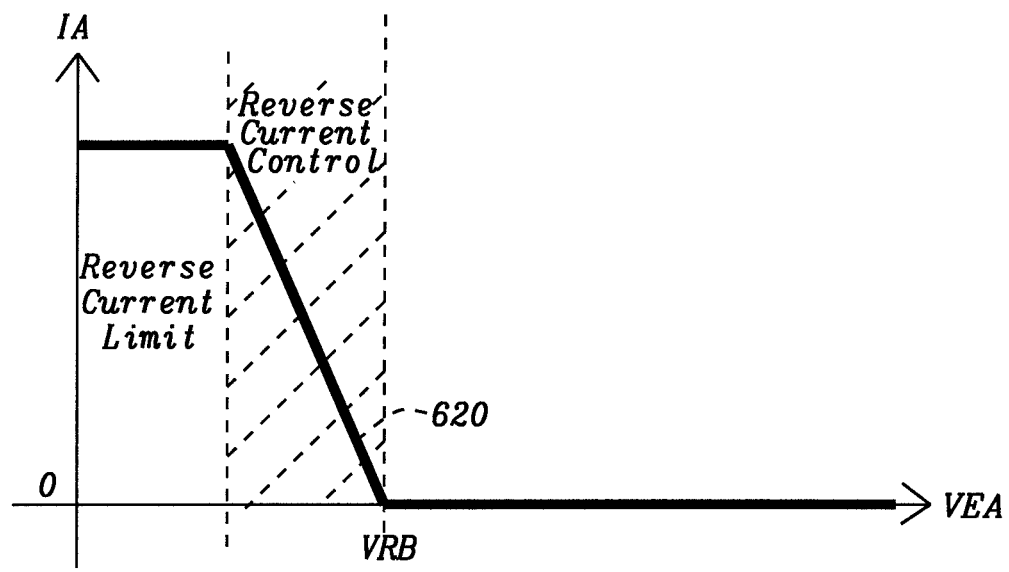

FIG. 6B illustrates the variation of the additional current IA 620 as a function of the amplified error voltage VEA. When the output voltage VOUT of the DC-DC converter becomes slightly higher than its target value due to a shortage of the reverse current, then the amplified error voltage VEA decreases and, at some point, becomes lower than the base voltage VRB of the ramp voltage VRAMP. The adjuster current IA generated by the current adjuster 510 starts increasing linearly with a coefficient that depends on the difference between the voltages VEA and VRB. As IA increases, VRLIM increases and the corresponding amount of reverse current also increases. Eventually, the amplified error voltage VEA converges to a voltage corresponding to the necessary amount of reverse current for the load condition, the adjuster current then remains constant. It will be appreciated that the ramp voltage VRAMP may be used instead of the base voltage VRB if they are equal at the time when the reverse current limit reference voltage VRLIM is used for the comparison.

Figure 7:
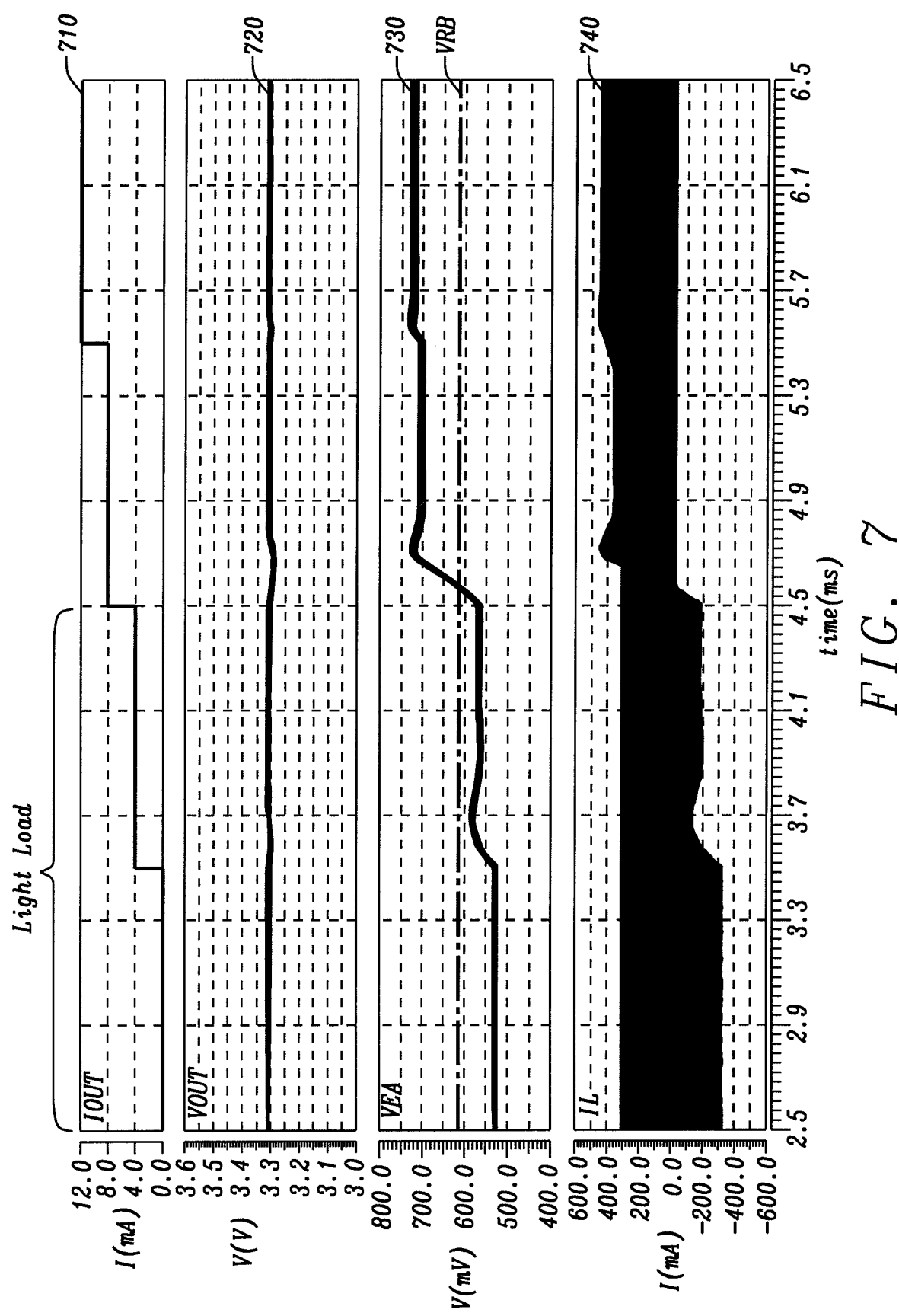
FIG. 7 is a simulation of the inductor current in light load condition and normal load condition using the circuit of FIGS. 5A and 5B.

FIG. 7 is a simulation of several electrical parameters of the circuit according to FIG. 3 when the adaptive reverse current limit reference generator is implemented according to the circuit of FIG. 5. FIG. 7 shows simulations of the load current 710, the output voltage 720, the amplified error voltage VEA 730 of the error amplifier and the inductor current 740, obtained for increasing load conditions as a function of time.

The peaks and the valleys of the inductor current both vary as a function of the load current 710. In light load conditions, for instance for a load current between 0 mA and 4 mA, the peak of the inductor current is function of the minimum pulse width of the DC-DC converter. The valley of the inductor current corresponding to the amount of reverse current, is adjusted depending on the amplified error voltage VEA, in order to maintain the regulation of the output voltage VOUT. For larger load conditions, for instance between 8 mA and 12 mA of load current, the valley of the inductor current is controlled to nearly zero and the peak of the inductor current is adjusted depending on the amplified error voltage VEA.

Figure 8:
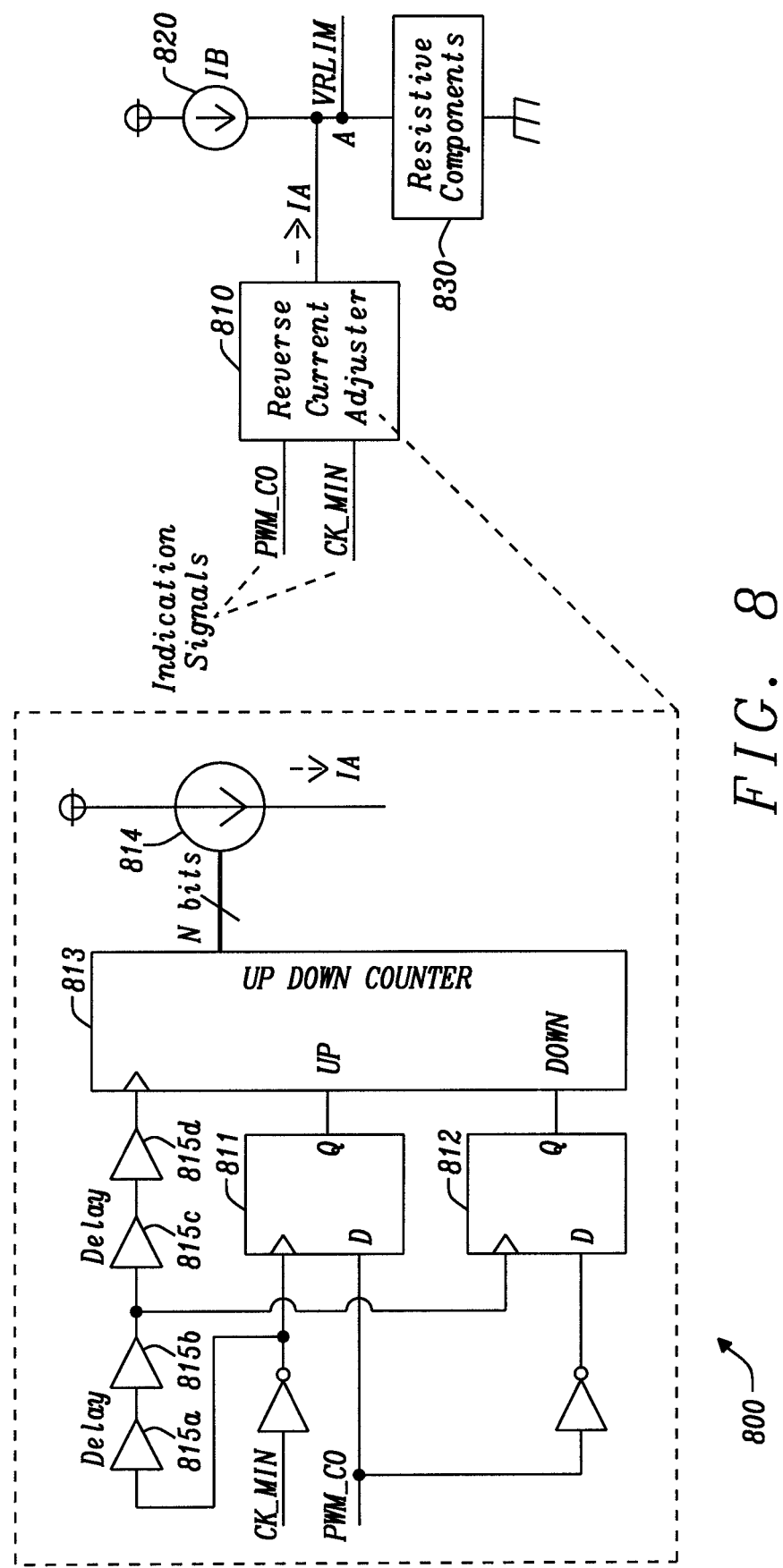
FIG. 8 is a diagram of another adaptive reverse current limit reference generator for use with the circuit of FIG. 3.

FIG. 8 is a diagram of another adaptive reverse current limit reference generator. The generator 800 includes a reverse current adjuster 810 adapted to generate an adjuster current based on two digital indication signals. The reverse current adjuster 810 has a first input for receiving the OFF-trigger signal PWM_CO, a second input for receiving the ON-trigger signal CK_MIN and an output for providing the adjuster current IA. The output of the reverse current adjuster is coupled to the output of a current source 820 and to a resistive component 830 at node A.

In operation, the adjuster current IA is increased from a value in the previous cycle when the OFF-trigger signal PWM_CO turns high (that is when Vramp>VEA) before the ON-trigger signal CK_MIN turns Low. Following the same principle, the adjuster current IA is decreased from a value in the previous cycle when the OFF-trigger signal PWM_CO turns high after the ON-trigger signal CK_MIN turns Low. The reverse current is then adjusted to a minimum amount required for regulating of the output voltage of the DC-DC converter for each load condition, and the amplified error voltage VEA converges to a voltage corresponding to the minimum pulse width TMIN.

An advantage of this circuit lies on the fact that the amplified error voltage VEA remains at a relatively high level compared with the circuit of FIG. 5. In the example of FIG. 5, the voltage VEA is lower than VRB when the reverse current is required. By contrast, in the example of FIG. 8 the logic signals PWM_CO and CK_MIN adjust the reverse current while VEA stays at a level corresponding to the minimum pulse width that is greater than VRB. As a result the adaptive reverse current limit reference generator 800 responds faster to a sudden increase in load current compared with the generator 500 of FIG. 5.

The reverse current adjuster 810 may be implemented using various topologies. In the present example the current adjuster 810 includes a first D-type flip flop 811, a second D-type flip flop 812, a counter 813, and a current source 814. The first D flip flop 811 has a data input for receiving the OFF-trigger signal PWM_CO, a clock input for receiving the inverse of the ON-trigger signal CK_MIN and an output Q for providing an up count signal. The second D flip flop 812 has a data input for receiving the inverse of the OFF-trigger signal PWM_CO, a clock input for receiving the inverse of the ON-trigger signal CK_MIN delayed by a first delay and an output Q for providing a down count signal. The counter 813 has a first input for receiving the up count signal from the first D flip flop 811, a second input for receiving the down count signal from the second D flip flop 812, and a third input for receiving the inverse of the ON-trigger signal CK_MIN delayed by a second delay. The counter 813 is also provided with an output for providing a digital code. The second delay is greater than the first delay. For instance the first delay may be implemented by a first delay line made of delay cells 815a and 815b. The second delay may be implemented by a delay line made of delay cells 815a, 815b, 815c and 815d. The current source 814 is coupled to the output of the counter 813. In operation the signals CK_MIN and PWM_CO are used to adjust the digital code that controls the adjuster current IA provided by the current source 814.

Figure 9:
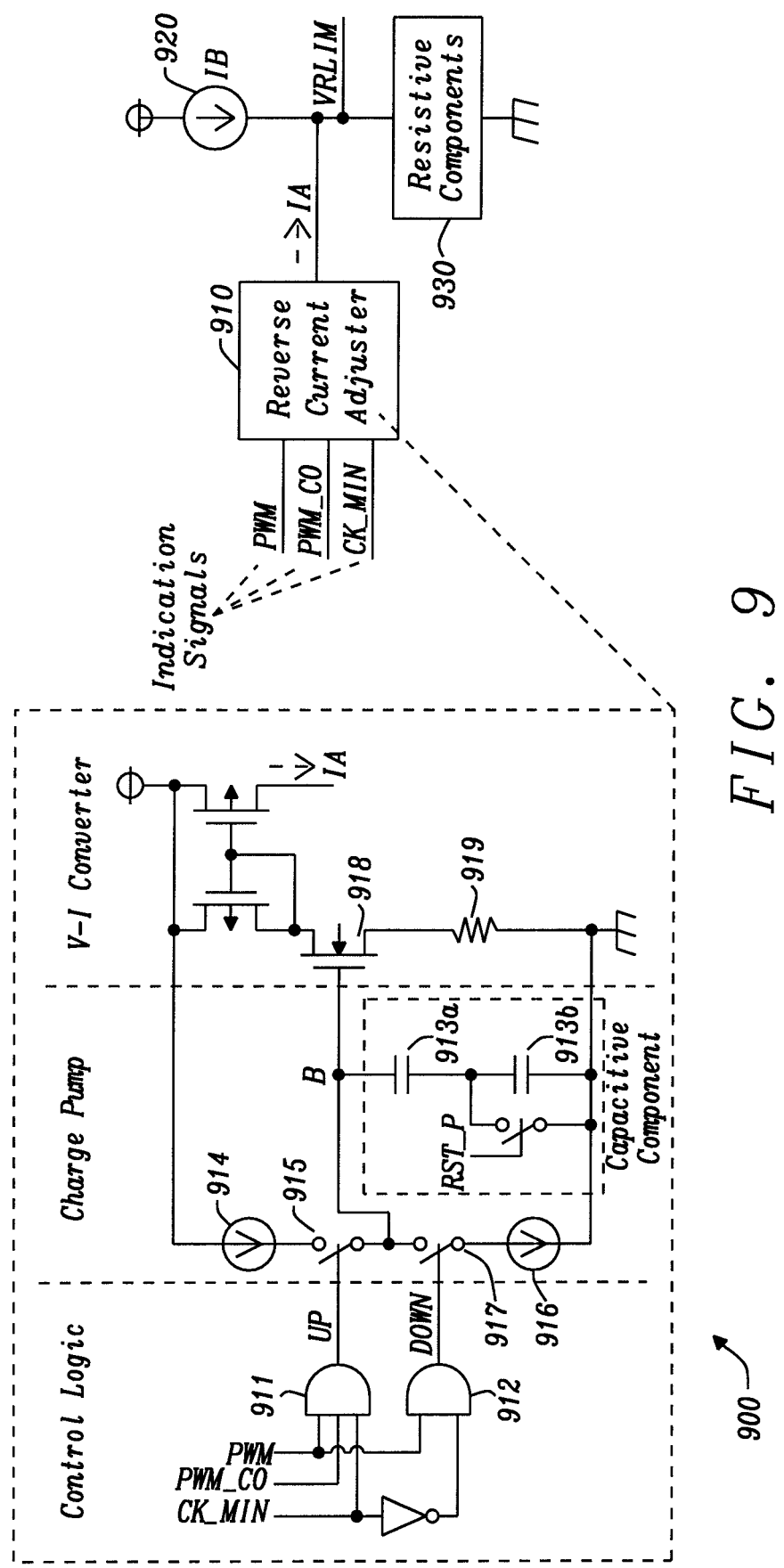
FIG. 9 is a diagram of yet another adaptive reverse current limit reference generator for use with the circuit of FIG. 3.

FIG. 9 is a diagram of another adaptive reverse current limit reference generator. The generator 900 includes a reverse current adjuster 910 adapted to generate an adjuster current based on three digital indication signals. The reverse current adjuster 910 has a first input for receiving the PWM signal, a second input for receiving the OFF-trigger signal PWM_CO, a third input for receiving the ON-trigger signal CK_MIN and an output for providing the adjuster current IA. The output of the reverse current adjuster 910 is coupled to the output of a current source 920 and to a resistive component 930 at node A.

In operation, the time difference between a change of state of the ON-trigger signal CK_MIN and a change of state of the OFF-trigger signal PWM_CO is used for improving the control of the reverse current. When the OFF-trigger PWM_CO turns high before the ON-trigger CK_MIN turns low with a time difference Δt1, the adjuster current IA is increased with a positive gradient or slope from a value in the previous cycle. The increase is applied for a duration corresponding to the time difference Δt1. When the OFF-trigger PWM_CO turns high after the ON-trigger CK_MIN turns low with a time difference Δt2, the adjuster current IA is decreased with a negative gradient or slope from a value in the previous cycle. The decrease is applied for a duration corresponding to the time difference Δt2. The reverse current is then adjusted to a minimum amount required for proper regulation of the output voltage of the DC-DC converter for each load condition, and the output voltage VEA of the error amplifier converges to a voltage corresponding to the minimum pulse width TMIN.

The reverse current adjuster 910 may be implemented using various topologies. In the present example the current adjuster 910 includes a control logic circuit, a charge pump and a voltage-to-current converter. The control logic circuit has a first AND gate 911 and a second AND gate 912. The first AND gate 911 has three inputs for receiving the signals PWM, PWM_CO and CK_MIN, respectively, and an output for providing an up signal. The second AND gate 912 has a first input for receiving the PWM signal, a second input for receiving the inverted CK_MIN signal and an output for providing a down signal. The charge pump includes a capacitive circuit formed of a first capacitor 913a connected in series with a second capacitor 913b, and a reset switch coupled in parallel with the second capacitor 913b for discharging it. A first current source 914 is coupled to the first capacitor 913a via a first switch 915 at node B. A second current source 916 is coupled to the first capacitor 913a via a second switch 917. The first switch 915 is controlled by the up signal of the control logic circuit and is referred to as UP switch. Similarly, the second switch 917 is controlled by the down signal of the control logic circuit and is referred to as DOWM switch. The voltage-to-current converter includes a transistor 918 having a first terminal coupled to a current mirror, a second terminal coupled to ground via a resistance 919 and a control terminal such as a gate terminal coupled to node B.

In operation, the indication signals are used to control the gate voltage V(B) of the transistor 918. The current flowing through the transistor 918 and through resistance 919 is mirrored to the output of the voltage-to-current converter, which is the adjuster current IA of the reverse current adjuster.

When the OFF-trigger PWM_CO turns high (for example logic 1) before the ON-trigger CK_MIN turns low (for example logic 0) the output of the first AND gate 911 is high while the output of the second AND gate 912 is low. Consequently, the up switch 915 is turned ON (closed) and the down switch is turned OFF (open). The first current source 914 provides a source current to charge the capacitive component. The voltage V(B) increases above the threshold value of the transistor 918, hence increasing the adjuster current IA, supplied to the resistive components 930.

When the OFF-trigger PWM_CO turns high after the ON-trigger CK_MIN turns low, the output of the first AND gate 911 is low while the output of the second AND gate 912 is high. Consequently, the up switch is turned OFF (open) and the down switch is turned ON (closed). The capacitive component is discharged hence lowering the voltage V(B). This decreases the adjuster current IA, supplied to the resistive components 930.

To improve the stability and responsiveness of the system, the second capacitor may be discharged at every cycle by a reset signal RST_P. For instance the RST_P signal may be asserted after the synchronous rectifier 120 tuns off and before the main switch 110 turns ON. The adaptive reverse current limit reference generator 900 improves further the response time and stability of the system.

Figure 10:
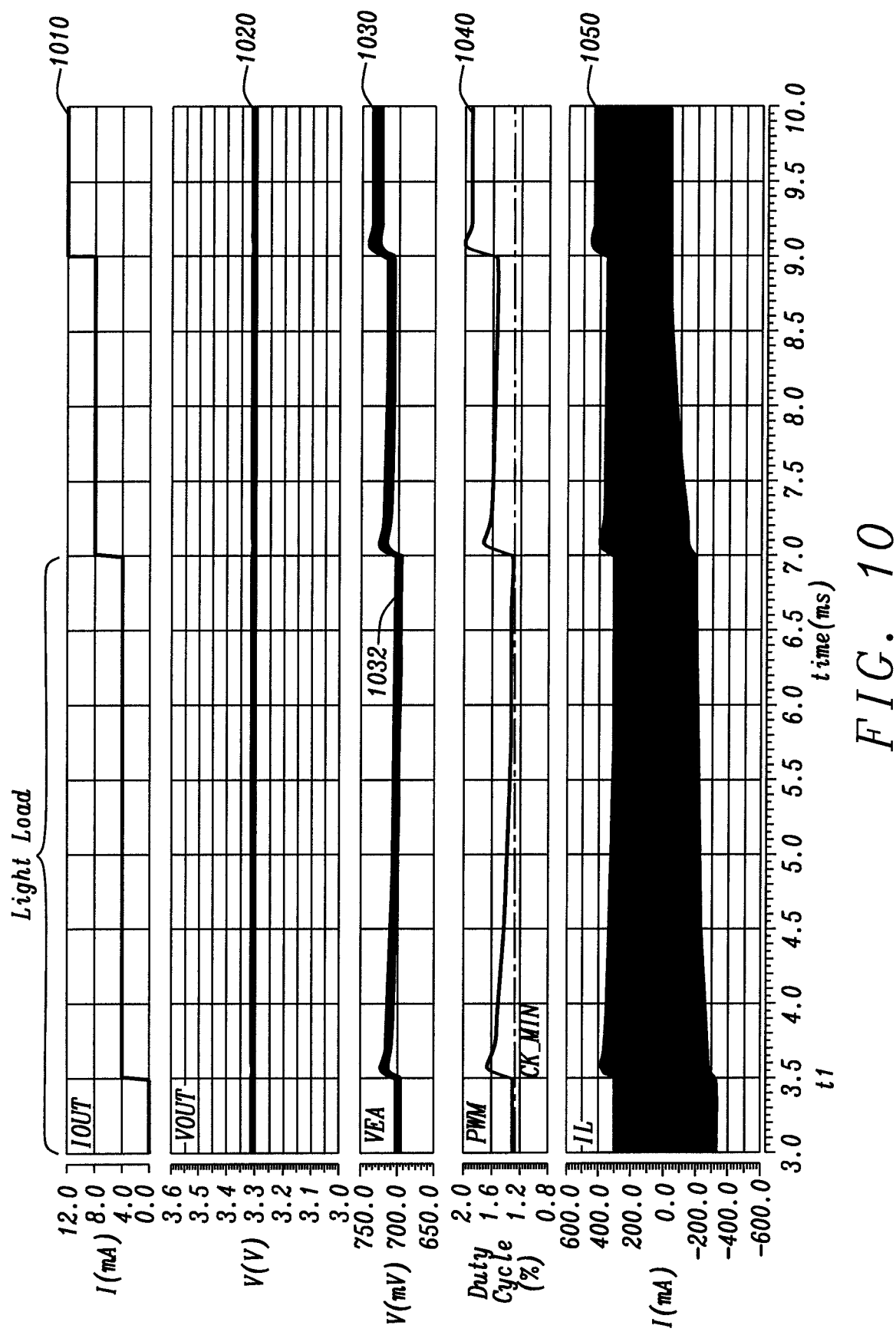
FIG. 10 is a simulation of the inductor current in light load condition and normal load condition using the circuit of FIG. 9.

FIG. 10 is a simulation of several electrical parameters of the circuit according to FIG. 3 when the adaptive reverse current limit reference generator is implemented according to the circuit of FIG. 9. FIG. 10 shows simulations of the load current 1010, the output voltage 1020, the amplified error voltage VEA 1030, the duty cycle (TPW/TSW) 1040 of the PWM signal, and the inductor current 1050. The simulations are provided for increased load conditions as a function of time.

The peaks and the valleys of the inductor current both vary as a function of the load current 1010. In light load conditions, for instance for a load current between 0 mA and 4 mA, the valley of the inductor current corresponding to the amount of reverse current, is adjusted depending on the three indication signals CK_MIN, PWM_CO and PWM. The amplified error voltage VEA 1030 converges to a voltage 1032 that turns the pulse width of the PWM signal to a minimum value defined by the ON-trigger signal CK_MIN.

At a time t1 the load increases from 0 mA to 4 mA. During such a load transient, the amplified error voltage VEA 1030 increases to maintain regulation of the output voltage VOUT of the DC-DC converter. This changes the timing of the OFF-trigger signal PWM_CO and, in turn the pulse width of the PWM signal. The reverse current limit reference generator then adjusts the amount of the reverse current gradually until VEA returns to the original voltage 1032 corresponding to the minimum pulse width of the PWM signal.

For larger load conditions, for instance between 8 mA and 12 mA of load current, the valley of the inductor current is controlled to nearly zero and the peak of the inductor current is adjusted depending on the amplified error voltage VEA.

Figure 11:
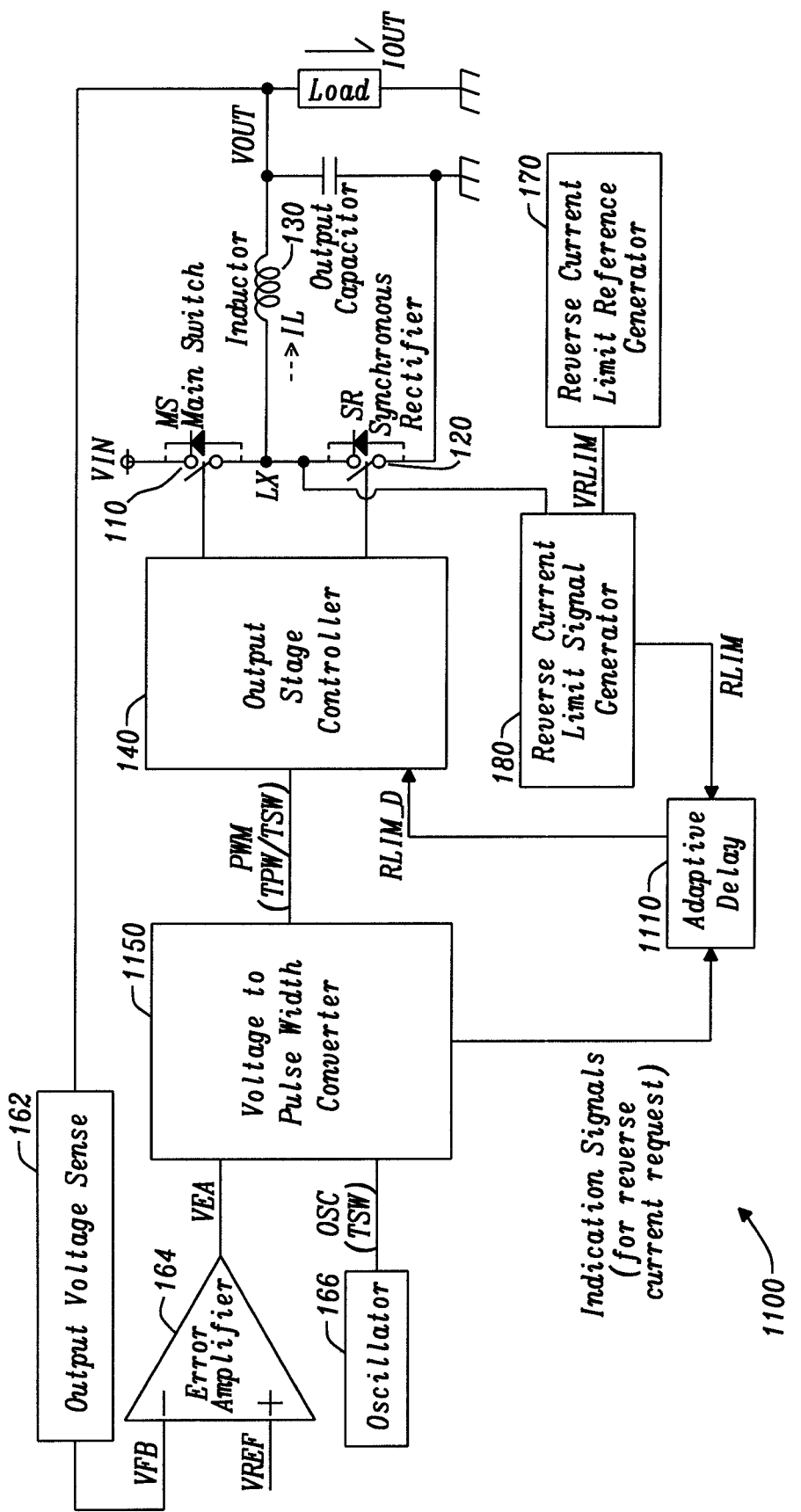
FIG. 11 is a diagram of another circuit for implementing the method of FIG. 2.

FIG. 11 is a diagram of another circuit for implementing the method of FIG. 2. The DC-DC converter 1100 of FIG. 11 shares several components with the converter 100 of FIG. 1. Similar components have been labelled with the same reference number and these components will not be described for the sake of brevity. In FIG. 11, the voltage to pulse width converter 150 has been replaced with a voltage to pulse width converter 1150 adapted to provide one or more indication signals. An adaptive delay circuit 1110 is provided at the output of the reverse current limit signal generator 180 for delaying RLIM. The adaptive delay circuit 1110 has one or more inputs for receiving indications signals, another input for receiving the reverse current limit signal RLIM and an output for providing the delayed signal RLIM_D. In operation the delay of the adaptive delay circuit is adjusted depending on the indication signals. When the indication signals imply a shortage of reverse current, the delay is increased. Similarly when the indication signals imply an excess of reverse current, the delay is reduced.

Figure 12:
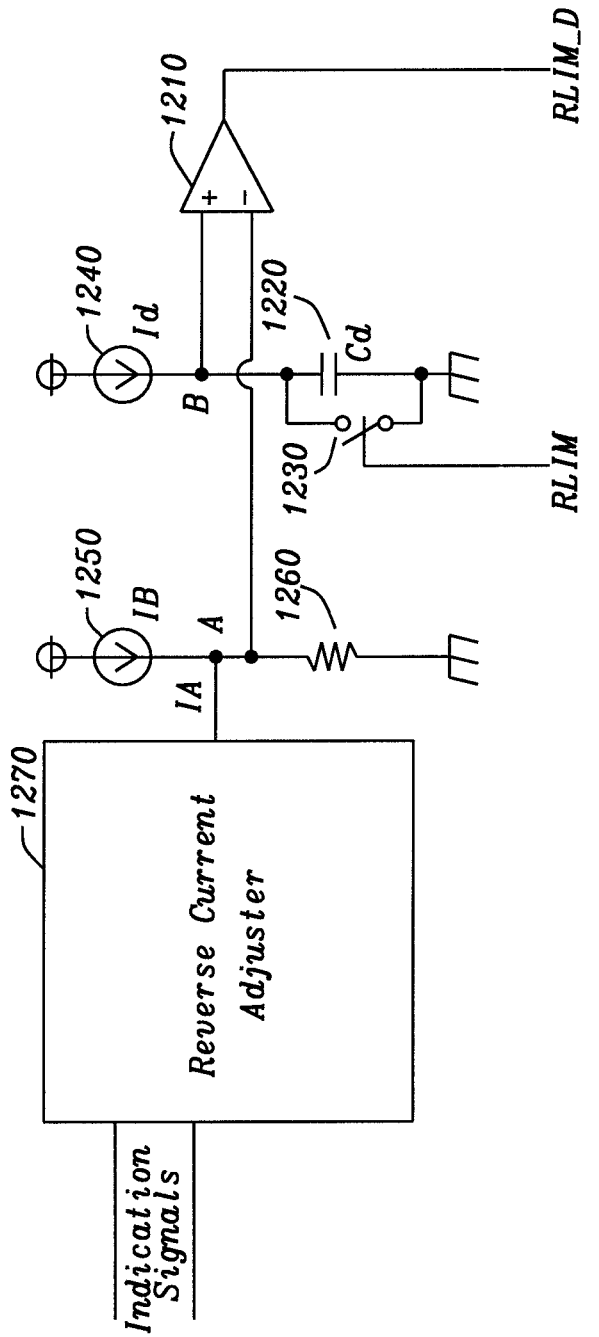
FIG. 12 is a diagram of an adaptive delay for use with the circuit of FIG. 11.

FIG. 12 is an example implementation of an adaptive delay for use with the circuit 11. The adaptive delay 1200 includes a comparator 1210, a capacitor 1220 provided with a discharge switch 1230, a first current source 1240 for providing a current Id, a second current source 1250 for providing a current IB, a resistor 1260 and a reverse current adjuster 1270. The reverse current 1270 may be implemented as any one of the reverse current adjuster described with respect to FIGS. 5, 8 and 9 above. The reverse current adjuster 1270 is coupled to the second current source 1250 and the resistance 1260 at node A. The first current source 1240 is coupled to the capacitor 1220 at node B. The comparator 1210 has a first input coupled to node A and a second input coupled to node B and an output for providing the delayed signal RLIM_D. In operation, the reverse adjuster current provides the adjuster current IA at node A hence varying the voltage at node A. The comparator 1210 compares the voltage at node B with the voltage at node A and generates the delayed signal RLIM D.

A skilled person will appreciate that variations of the disclosed arrangements are possible without departing from the disclosure. Although the proposed method has been described in relation to buck converters, it will be appreciated that the proposed method can be applied to other types of DC-DC converters. For instance the method may be applied to boost or buck boost converters. Accordingly, the above description of the specific embodiment is made by way of example only and not for the purposes of limitation. It will be clear to the skilled person that minor modifications may be made without significant changes to the operation described.

What is claimed is:

1. A switching converter for providing an output voltage, the switching converter comprising
   an inductor coupled to a first power switch and a second power switch at a switching node, the first power switch being adapted to magnetize the inductor and the second power switch being adapted to de-magnetize the inductor;
   a signal generator adapted to generate a modulated signal having a pulse width variable between a minimum value and a maximum value; and
   a controller adapted
      to drive the first and second power switches based on the modulated signal; and
      to increase a reverse current flowing from the inductor through the second power switch to prevent the output voltage from increasing above a target value, upon identifying that the modulated signal has the minimum pulse width value.

2. The switching converter as claimed in claim 1, comprising a feedback circuit adapted to generate a regulation signal to adjust the pulse width based on the output voltage, wherein the controller is adapted to increase the reverse current upon identifying that the regulation signal is configured to reduce the pulse width.

3. The switching converter as claimed in claim 2, wherein the controller is adapted to provide a control signal to control an amount of the reverse current, and an adjustment signal to adjust the control signal.

4. The switching converter as claimed in claim 3, wherein the controller is adapted to generate the adjustment signal based on one or more signals generated by the signal generator.

5. The switching converter as claimed in claim 4, wherein the controller comprises a reference generator adapted to generate a reference voltage associated with an amount of reverse current.

6. The switching converter as claimed in claim 5, wherein the reference generator is adapted to generate the adjustment signal and to adjust the reference voltage using the adjustment signal.

7. The switching converter as claimed in claim 5, wherein the controller comprises a comparator adapted to compare a voltage at the switching node with the reference voltage to generate the control signal.

8. The switching converter as claimed in claim 5, wherein the adjustment signal is an adjuster current, the reference generator comprising an adjuster circuit for generating the adjuster current.

9. The switching converter as claimed in claim 8, wherein the signal generator comprises a ramp generator configured to provide a ramp voltage based on a base voltage; and a comparator adapted to compare the ramp voltage with the regulation signal to provide a first logic signal.

10. The switching converter as claimed in claim 9, wherein the adjuster circuit is adapted to generate the adjuster current based on a difference between the base voltage and the regulation signal.

11. The switching converter as claimed in claim 9, wherein the signal generator comprises a pulse-width generator adapted to provide a second logic signal, the adjuster circuit being adapted to generate the adjuster current based on the first logic signal and the second logic signal.

12. The switching converter as claimed in claim 11, wherein the adjuster circuit comprises a counter coupled to a current source.

13. The switching converter as claimed in claim 11, wherein the signal generator comprises a memory device adapted to generate the modulated signal based on the first logic signal and the second logic signal, the adjuster circuit being adapted to generate the adjuster current based on the first logic signal, the second logic signal and the modulated signal.

14. The switching converter as claimed in claim 13, wherein the adjuster circuit comprises a charge pump coupled to a voltage-to-current converter.

15. The switching converter as claimed in claim 3, wherein the controller comprises a delay circuit coupled to the signal generator; the delay circuit being adapted to delay the control signal based on the adjustment signal.

16. The switching converter as claimed in claim 15, wherein the adjustment signal is an adjuster current, the delay circuit comprising an adjuster circuit for generating the adjuster current.

17. The switching converter as claimed in claim 1, wherein the switching converter is adapted to operate with a constant switching frequency.

18. A method of controlling a switching converter comprising an inductor coupled to a first power switch and a second power switch at a switching node, the first power switch being adapted to magnetize the inductor and the second power switch being adapted to de-magnetize the inductor; the method comprising generating a modulated signal having a pulse width variable between a minimum value and a maximum value;

driving the first and second power switches based on the modulated signal for regulating an output voltage of the switching converter; and upon identifying that the modulated signal has the minimum pulse width value, increasing a reverse current flowing from the inductor through the second power switch to prevent the output voltage from increasing above a target value.

19. The method as claimed in claim 18, comprising providing a control signal to control an amount of the reverse current, and generating an adjustment signal to adjust the control signal.

20. The method as claimed in claim 19, comprising providing a reference voltage associated with an amount of reverse current and adjusting the reference voltage using the adjustment signal.

21. The method as claimed in claim 19, comprising delaying the control signal using the adjustment signal.

22. The method as claimed in claim 18, wherein the inductor provides an inductor current oscillating between valley and peak values that vary for different load conditions; wherein the reverse current corresponds to a valley inductor current.

\* \* \* \* \*